United States Patent [19]

Kakuzen et al.

[11] 4,225,330

[45] Sep. 30, 1980

[54] PROCESS FOR PRODUCING GLASS MEMBER

[75] Inventors: Hideo Kakuzen; Shiro Kurosaki; Yuichi Usui, all of Yokohama, Japan

[73] Assignee: Sumitomo Electric Industries, Ltd., Osaka, Japan

[21] Appl. No.: 926,774

[22] Filed: Jul. 21, 1978

[30] Foreign Application Priority Data

| Jul. 27, 1977 | [JP] | Japan | 52/90619 |
| Aug. 26, 1977 | [JP] | Japan | 52/102890 |
| Aug. 29, 1977 | [JP] | Japan | 52/104097 |
| Nov. 28, 1977 | [JP] | Japan | 52/143081 |

[51] Int. Cl.$^2$ .................. C03B 19/06; C03C 3/04; C03C 3/12; C03C 21/00
[52] U.S. Cl. ................... 65/18; 65/30 R; 65/31; 65/32
[58] Field of Search ............ 65/2, 18, DIG. 7, 31, 65/18, 32, 30 R, 144, 157

[56] References Cited

U.S. PATENT DOCUMENTS

| 3,460,926 | 8/1969 | Weaver | 65/18 |
| 3,859,073 | 1/1975 | Schultz | 65/18 X |
| 3,868,170 | 2/1975 | DeLuca | 65/18 X |
| 3,933,454 | 1/1976 | DeLuca | 65/18 X |
| 3,938,974 | 2/1976 | Macedo et al. | 65/DIG. 7 |
| 3,982,916 | 9/1976 | Miller | 65/18 X |
| 4,061,486 | 12/1977 | Jahn | 65/18 |
| 4,062,665 | 12/1977 | Izawa et al. | 65/2 X |
| 4,110,093 | 8/1978 | Macedo et al. | 65/30 R X |
| 4,110,096 | 8/1978 | Macedo et al. | 65/30 R |

Primary Examiner—Richard V. Fisher
Attorney, Agent, or Firm—Sughrue, Rothwell, Mion, Zinn and Macpeak

[57] ABSTRACT

A process for producing a glass member includes subjecting a silicon, boron, phosphorous or aluminum compound or both a silicon, boron, phosphorous or aluminum compound and a dopant compound to vapor phase reaction to form a fine powder of fused silica, borate, phosphate or alumina or doped fused silica, borate, phosphate or alumina. Then the powder is partially sintered to form a porous glass body which subsequently is immersed in a solution containing a dopant compound thereby depositing the dopant compound on the surfaces of the pores in the glass body. Thereafter, the porous glass body is dried before the pores are collapsed to form the glass member.

30 Claims, 21 Drawing Figures

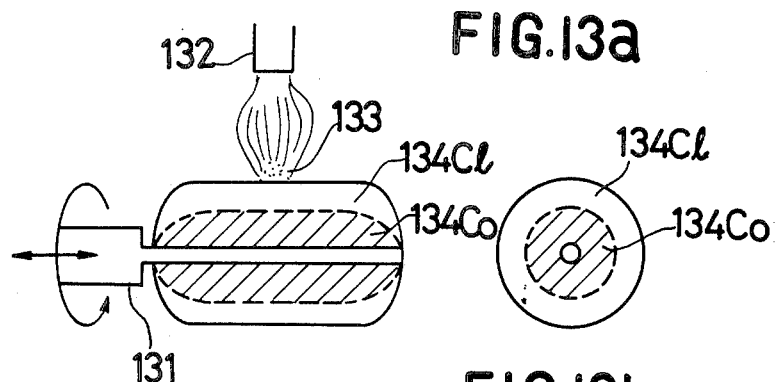
FIG.13a
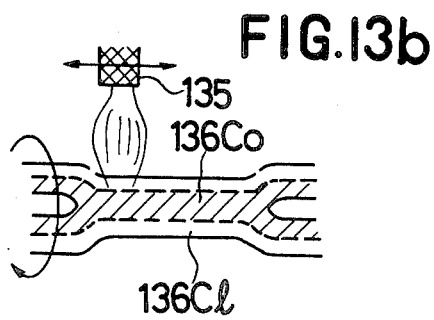
FIG.13b
FIG.14b
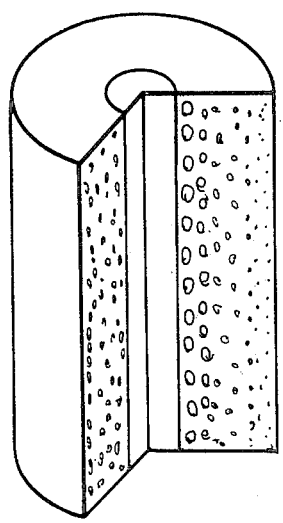
FIG.14a
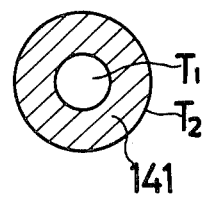

FIG.15
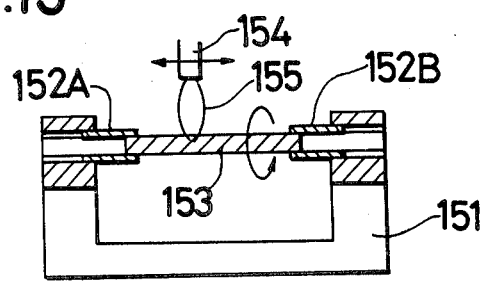
FIG.16
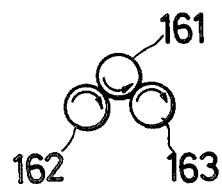
FIG.17
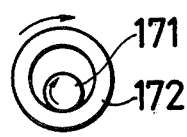
FIG.18a
FIG.18b
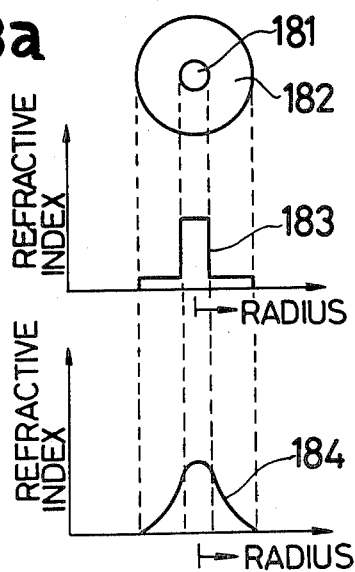

PROCESS FOR PRODUCING GLASS MEMBER

BACKGROUND OF THE INVENTION

1. Field of the Invention

The present invention relates to a process for producing a glass member (preform) used for making glass fibers for optical transmission.

2. Description of the Prior Art

The properties required of a glass preform for a glass fiber are it should have a certain definite refractive index distribution in the radial direction (when the preform is in the shape of a rod); the concentration of the dopant in the preform should be substantially free from variation; the concentrations of impurities such as transition metals (e.g., iron or copper) or hydroxyl groups should be low; and the preform should transmit light well.

One method for producing such a preform at low cost is disclosed in Japanese patent application (OPI) Nos. 28339/75, 126207/76 and 135915/76 (The term "OPI" as used herein refers to a "published unexamined Japanese patent application"), and involves doping a porous glass body made of a phase-separable glass with a dopant capable of changing the refractive index of the glass.

Such a method, however, has the following disadvantages.

(i) In order to reduce the cost of production, powdery materials (such as $SiO_2$, $K_2CO_3$, $Na_2CO_3$ and $H_3BO_3$) with large amounts of impurities are used as starting materials, and removal of the impurities is attempted by utilizing the fact that the impurities are concentrated into the soluble phase during the step of phase separation by heat-treatment. The effect of this, however, decreases as the concentration of the impurities in the starting materials decreases.

(ii) Use of high-purity starting materials in an attempt to reduce the amount of impurities, on the other hand, offsets the advantage of reduced cost.

(iii) The pores of the porous glass body must be uniformly distributed throughout the entire glass body to dope the glass with a given dopant and achieve uniform vitrification. A phase-separable glass, however, is thermal history dependent, and the pores of such a glass are not uniform.

(iv) Moisture present in the starting materials and introduced at the time of melting the glass results in hydroxyl groups remaining in a $B_2O_3$—$SiO_2$ glass which forms a matrix of the porous glass body. Removal of the hydroxyl groups is by no means easy even if various modified heat-treatment procedures are utilized.

Japanese patent application (OPI) Nos. 119878/74 and 73908/75 disclose a process for preparing a transparent glass body which comprises immersing a fine silica powder obtained, for example, using a flame hydrolysis method in an aqueous solution to impregnate the pores with salts and sintering the silica powder. Such a method, however, has the following disadvantages.

(i) If flame hydrolysis is to be used to produce somewhat solid masses of fine silica glass powder which do not break in an aqueous solution, the powder at the center of a mass is exposed to heat for longer periods of time as the size of the powder mass increases. Hence, sintering advances further at the center of the mass, and a difference in porosity arises between the outside of the powder mass and the powder mass near its center. Consequently, it is difficult to control the porosity of the powder mass.

(ii) If the fine glass powder mass is to be hardened to some extent, the temperature for reacting the fine glass powder as well as the temperature of the fine glass powder produced must be increased. As a result, the temperature of the fine glass powder mass that serves as a target onto which powder is subsequently deposited becomes high, and the rate of adhesion of the fine glass powder is decreased.

(iii) If a fine glass powder mass having a controlled porosity is to be produced in a good yield, the resulting glass powder mass becomes so soft that it easily breaks in an aqueous solution. This poses a serious problem when controlled doping is to be carried out by changing the temperature or the concentration of the aqueous solution.

SUMMARY OF THE INVENTION

An object of this invention is to provide a process for producing a glass member which is free from the defects described above.

Another object of the invention is to provide a process for producing a preform capable of being used to produce low transmission loss optical fibers at low cost.

Still another object of the invention is to provide a process for producing a preform of a predetermined refractive index distribution suitable for producing fibers having a low signal distortion.

According to the invention, an agglomerate of a fine glass powder is prepared by a chemical vapor deposition (CVD) method (in a broad sense), and partially sintered to form a porous glass body containing uniformly distributed pores that are interconnected. This porous glass body is used as a substitute for a porous glass body obtained from a phase-separable glass.

The present invention in one embodiment thus provides a process for producing a glass member which comprises (1) subjecting a silicon compound or both a silicon compound and a dopant compound to vapor phase reaction to form a fine powder of fused silica or doped fused silica;

(2) partially sintering the fused silica or doped fused silica powder in an inert gas or in a vacuum to form a porous glass body;

(3) immersing the porous glass body in a solution containing a dopant compound;

(4) depositing the dopant compound on the surfaces of the pores in the porous glass body;

(5) drying the glass body in a vacuum; and then (6) collapsing the pores of the glass body in a vacuum, in an anhydrous oxygen gas atmosphere and/or in an anhydrous inert gas atmosphere to produce the glass member.

The invention also in another embodiment provides a process for producing a preform having a predetermined refractive index distribution which comprises conducting the process described above and depositing the dopant compound in the pores of the porous glass body in a predetermined concentration distribution in the radial direction.

BRIEF DESCRIPTION OF THE DRAWINGS

FIG. 13-a is a view illustrating the preparation of a fine glass powder for producing a porous glass body;

FIG. 13-b is a view illustrating the collapsing of the hollow of a transparent glass tube using a glass lathe, whose cavity was previously closed;

FIG. 14-a is a view showing a partially sintered product of a cylindrical porous glass body;

FIG. 14-b is a view schematically showing the porosity of the partially sintered porous glass body of FIG. 14-a;

FIG. 15 is a view showing an example of a glass lathe used for performing the heat treatment in accordance with the invention;

FIGS. 16 and 17 are views illustrating two methods for performing the heat treatment used in the present invention; and FIGS. 18-a and 18-b are diagrams showing the changes in the refractive index distribution during the heat-treating of a glass rod in accordance with the invention.

DETAILED DESCRIPTION OF THE INVENTION

Since the process of the invention employs a fine silica powder made from a silicon compound by the CVD method, a porous glass body having reduced amounts of impurities can be obtained at low cost. Furthermore, because the process of the invention begins with a fine powder having a relatively controlled particle size, it is possible to obtain a porous glass body having uniformly distributed pores that are interconnected.

The process for producing a preform for making glass fibers for optical transmission by the present invention includes the following four principal procedures:

(I) preparing an agglomerate of a fine glass powder,
(II) partially sintering the agglomerate of the fine glass powder,
(III) doping the glass body with a dopant, and
(IV) drying the glass body in a vacuum and collapsing the pores of the glass body.

The basic procedures used in the invention and the steps of the process of this invention are described in detail below.

STEP (1) PREPARATION OF AN AGGLOMERATE OF A FINE GLASS POWDER

As described above, the fine glass powder can be prepared by a vapor phase reaction such as a flame hydrolysis or an oxidative decomposition, e.g., as described in U.S. Pat. Nos. 4,017,288, 3,957,474, 3,741,796, 3,826,560, 3,923,484, etc., Werner Kern and Richard C. Heim, "Chemical Vapor Deposition of Silicate Glasses for Use with Silicon Devices", *J. Electrochem. Soc. Electrochemical Technology*, pp. 562–567 (April 1970), Bun Kikuchi, Koji Okamura and Tadao Arima, "Preparation of Pure Silica Bulk for Optical Fiber", *Fujitsu Scientific & Technical Journal*, pp. 99–113 (June 1975), etc.

More specifically, FIGS. 2 to 5 show processes for preparing an agglomerate of a fine glass powder, which can be used in step (1) of the present invention and which are desirable from the standpoint of mass production. These processes for preparing an agglomerate of fine powders are known.

Figure 2:
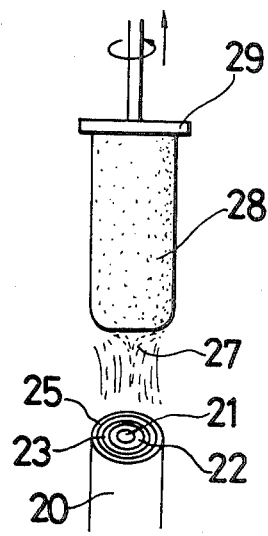
FIG. 2 shows a process for preparing an agglomerate of a fine glass powder using flame hydrolysis.

Referring now to FIG. 2, starting materials and combustion gases are blown from a quartz burner 20. In this case, starting material gases such as $SiCl_4$ and $SiH_4$ (carried by, e.g., argon and nitrogen) are blown from an orifice 21 of the burner, an inert gas such as argon and nitrogen is blown from an orifice 22 to remove any clogging by the fine glass powder, oxygen for combustion is blown from an orifice 23, hydrogen for sintering is blown from an orifice 24, and oxygen for combustion and a shielding gas are blown from an orifice 25.

Most of these gases passing from these blow orifices react according to the following:

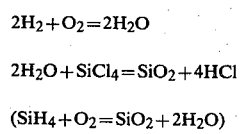

to form a fine silica powder 27 and the powder accumulates on a quartz plate 29, which is rotated and moved, as an agglomerate of the powder 28.

It is possible also to use $AlCl_3$, $POCl_3$, and $BBr_3$ as starting material gases.

While not to be considered limiting, in the above oxidative decomposition, a suitable temperature of the deposited powder is 950° C.; a suitable flow rate of the $SiCl_4$ is 120 cc/min, of the $O_2$ is 5 l/min, of the $POCl_3$ is 40 cc/min and of the $H_2$ is 4 l/min; while a suitable distance between the burner and the position of agglomerate of the fine glass powder is 50 mm. These parameters are merely exemplary and such can be easily varied by one skilled in the art.

Figure 3:
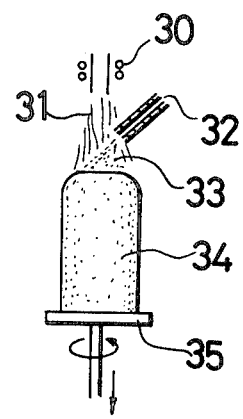
FIG. 3 shows a process for preparing an agglomerate of a fine glass powder using a plasma-flame high-temperature reaction.

Referring to FIG. 3, the starting material $SiCl_4$ gas carried, for example, by argon or nitrogen is fed, through tube 32, such that it traverses a plasma flame 31 produced by a high frequency plasma torch, 30, with the starting material gas being surrounded by oxygen. At a high temperature, the starting material gas reacts according to the following:

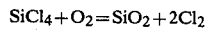

to form a fine glass powder 33 which accumulates on a revolving and moving quartz plate 35 as an agglomerate of a fine glass powder 34.

While not to be considered limiting, in the above process using a plasma torch, a suitable flow rate of the $SiCl_4$ is 120 cc/min and of the $O_2$ is 5 cc/min; a suitable frequency is 3.5 MHz, a suitable pressure is 1 atm and a suitable collector size is 30 mm $\phi$. These parameters are merely exemplary and such can be easily varied by one skilled in the art.

Figure 4:
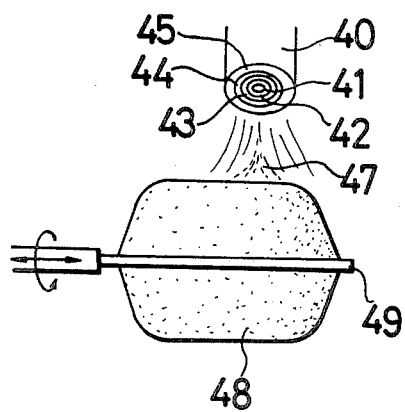
FIG. 4 shows one embodiment of a process for preparing an agglomerate of a fine glass powder on a starting material using flame hydrolysis.

FIG. 4 corresponds to FIG. 2, in which a fine silica powder 47 produced in the same manner as described with reference to FIG. 2 accumulates on a rotating and reciprocally moving refractory mandrel 49 made of carbon, thereby to prepare an agglomerate of a fine glass powder 48. In FIG. 4, starting material gases such as $SiCl_4$, $POCl_3$, $BBr_3$ and $SiH_4$ are blown from an orifice 41 of the burner, an inert gas such as argon and nitrogen is blown from an orifice 42 to remove any clogging by the fine glass powder, oxygen for combustion is blown from orifice 43, hydrogen for sintering is blown from an orifice 44, and oxygen for combustion and a shielding gas are blown from an orifice 45.

Figure 5:
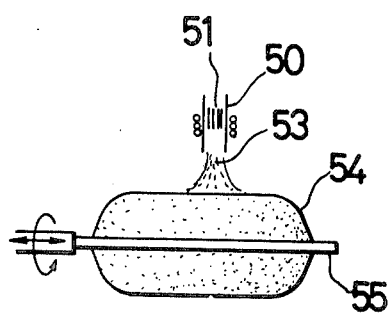
FIG. 5 shows another embodiment of a process for preparing an agglomerate of a fine glass powder on a starting material using a plasma-flame high-temperature reaction.

FIG. 5 corresponds to FIG. 3 (with the exception that the nozzle and the torch are formed as an integral structure), in which a fine silica powder 53 formed in the same manner as above accumulates on a rotating and reciprocally moving refractory mandrel 55 made of carbon, thereby to prepare an agglomerate of a fine glass powder 54.

The nozzle, 51, and torch, 50, may, of course, be provided separately as shown in FIG. 3.

Quartz, carbon or any other material which is heat-resistant and is not a contaminating material can be used as the refractory material for the mandrel.

The fine silica powder agglomerate can be obtained by the methods described above. A fine powder agglomerate of doped fused silica can also be formed by using an admixture of a silica compound and a dopant compound. For example, a network former oxide such as $P_2O_5$, $B_2O_3$, $Al_2O_3$, etc., can be used in an amount of 0 to about 25 wt%. The average particle size, the particle size distribution, and the bulk density of the fine powder agglomerate of fused silica or doped fused silica will differ depending upon the thermal history which includes the reaction temperature, the course occurring until the fine powder is accumulated and the course occurring until the accumulated fine powder agglomerate is cooled. In general, a particle size of about 0.1 to about 1 $\mu$m is obtained.

However, as will be understood from the examples of Aerosil (trade name, produced by Nippon Aerosil) which is a silica glass powder produced by flame hydrolysis, the average particle size, the particle size distribution and the bulk density of the fine powder agglomerate can be relatively well controlled by adjusting the production conditions.

STEP (2) PARTIAL SINTERING OF THE FINE GLASS POWDER AGGLOMERATE

The theory of sintering based on viscosity has basically been formulated by Frenkel and Keuzyrski, e.g., as described in J. K. Machenzie and R. Shuttleworth, "A Phenomenological Theory of Sintering", *Proc. Phys. Soc.*, LXII, 12-B 62B 833-853 (1949). A modified formula derived from this theory is as follows:

$$(\Delta L/L_0) = (3\gamma/4a\eta) \cdot t \qquad (1)$$

$\gamma$ is the surface tension (in $kg \cdot m \cdot sec^{-2} \cdot m^{-1}$);
a is the radius of the glass particles (in m);
$\eta$ is the coefficient of viscosity of the glass when melted ($kg \cdot m^{-1} \cdot sec^{-1}$);
in which
$\eta = \eta(T) = A_3 + (B/T - T_0)$ wherein $A_3$, B and $T_0$ (in °K.) are constant, and T is the temperature (in °K.);
$L_0$ is the initial length (in m) of the glass powder agglomerate;
$\Delta L$ is the length of contraction (in m) of the glass powder agglomerate; and
t is the time (in sec) required for partial sintering.

In sintering fine glass powders, it has been confirmed that the above formula fits well experimentally over a range of from several percent to several tens of percent of the total volume.

Utilizing the above formula, it is possible to determine the partial sintering temperature and partial sintering time for the fine silica glass powder agglomerate obtained above and adjust the porosity.

From the relationship for a transparent glass $$L_\infty/L_0 = (\rho_0/\rho_\infty)^{\frac{1}{3}} \qquad (2)$$

where $L_\infty$ is the length of the glass after sintering (in m) $L_0$ is the initial length (in m), $\rho_0$ is the apparent density (in $g/cm^3$) of the fine glass powder and $\rho_\infty$ is the apparent density of the transparent glass (in $g/cm^3$).

From the relationship for porosity, $$(L_\infty/L_0 - \Delta L) = (X/100)^{\frac{1}{3}} \qquad (3)$$

where $L_\infty$, $L_0$ and $\Delta L$ are as defined above and X is the porosity (in %).

From relationships (2) and (3), $$L_0 - \Delta L/L_0 = (\rho_0/\rho_\infty)^{\frac{1}{3}} (100/X)^{\frac{1}{3}} \qquad (4)$$

From relationships (1) and (4), $$3\gamma/4a\eta \cdot t = 1 - (\rho_0/\rho_\infty)^{\frac{1}{3}} (100/X)^{\frac{1}{3}}$$

Therefore, $$t = 4a\eta/3\gamma [1 - (\rho_0/\rho_\infty)^{\frac{1}{3}} (100/X)^{\frac{1}{3}}] \qquad (5)$$

Here, the particle size of a fine powder of pure silica prepared by the CVD method is determined by the production conditions. In the case of flame hydrolysis, for example, the particle size will be $a = 5$ to $50 \times 10^{-9}$ m.

The surface tension $\gamma$ is temperature-dependent to some extent, and will be $\gamma = 250$ to $300 \times 10^{-8}$ $kg \cdot m \cdot sec^{-2} \cdot m^{-1}$.

Figure 6:
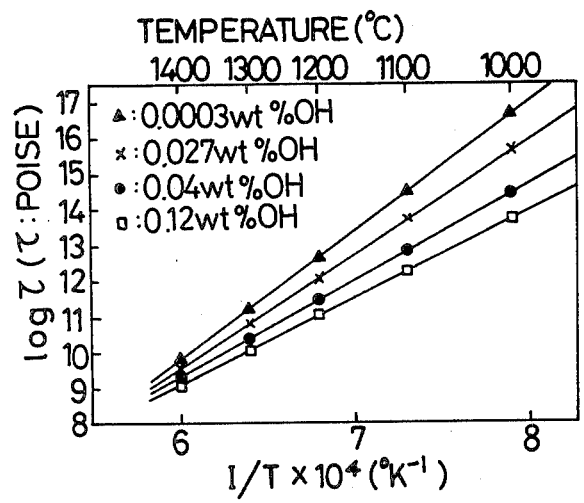
FIG. 6 is a diagram showing the viscosity data of a silica glass.
Figure 7:
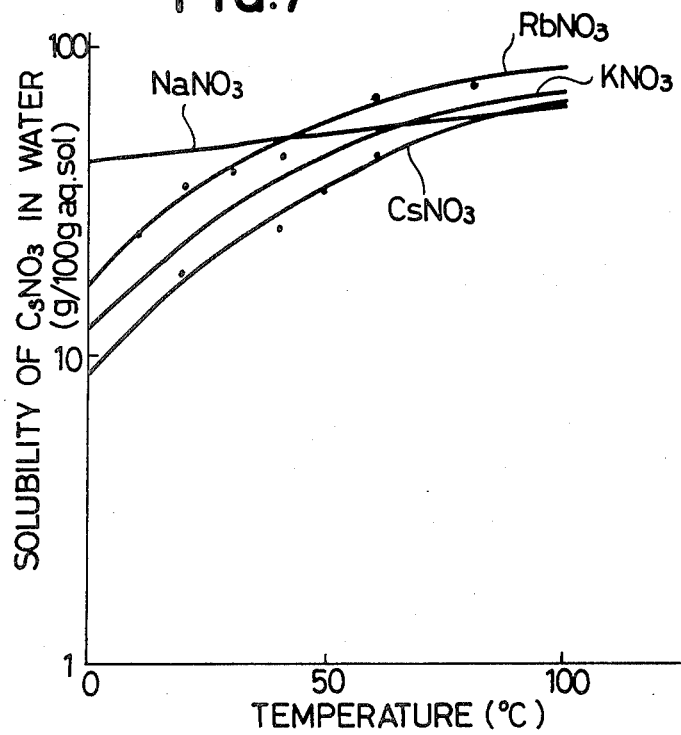
FIG. 7 is a diagram showing the solubility of $CsNO_3$ in water.

The viscosity is given by FIG. 6 (literature values).

For example, anhydrous silica heated at a temperature of 1,200° C. will have $\gamma = 10^{18}$ poise $= 10^{12}$ $kg \cdot m^{-1} \cdot sec^{-1}$.

X represents the porosity (%), $\rho_0$ the apparent density of the fine glass powder, and $\rho_\infty$ the density 2.2 $g/cm^3$ of a transparent glass.

The time t required for the partial sintering under this temperature condition (1,200° C.) is as follows:

$$t = \frac{4 \times (5 \sim 50) \times 10^{-9} \times 10^{12}}{3 \times (250 \sim 300) \times 10^{-8}} [1 - (\frac{\rho_0}{\rho_\infty})^{\frac{1}{3}} (\frac{100}{X})^{\frac{1}{3}}] \text{ sec}$$

$$=(0.22\sim2.6)\times 10^5[1-(\rho_0/\rho_\infty)^{\frac{1}{3}}(100/X)^{\frac{1}{3}}] \text{ sec}$$

$$=6.1\sim72[1-(\rho_0/\rho_\infty)^{\frac{1}{3}}(100/X)^{\frac{1}{3}}] \text{ hr}$$

Here, if the apparent density of the fine glass powder is given by $\rho_0=0.22$ g/cm$^3$·X=50(%), the calculation indicates that the partial sintering time will vary greatly depending upon the particle size a.

t=2.5 to 29.9 hours

The approach set forth above can be applied also to a multi-stage treatment by changing the combination of temperature and time. That is, the porosity can be adjusted by first heating the fine powder agglomerate at a higher temperature for a short period of time and then heating the powder agglomerate at a lower temperature for an extended period of time.

In practice, however, the calculation set forth above must be slightly modified based on the data related to the partial sintering temperature, time and porosity of the actually prepared fine powder agglomerate of silica glass. If the porosity is smaller than 10%, the powder agglomerate will be destroyed when immersed in an aqueous solution in the subsequent step of introducing the dopant. With a porosity of greater than 90%, on the other hand, a longer time will be required to introduce the dopant in the subsequent step, and doping will be effected only slightly. Hence, the porosity should preferably be about 50%.

The surface of the fine silica powder agglomerate prepared according to FIGS. 2 to 5 and provided with a predetermined porosity by the partial sintering can be ground, if the agglomerate has a poor appearance.

The target material of FIGS. 4 and 5 can be removed after the partial sintering has been completed. This can be done by utilizing the difference between the expansion coefficient of silica glass and that of the target material. The inside of the partially sintered product is then ground.

The partial sintering can be performed in a vacuum, e.g., at 10 μm Hg or less, in a dry inert gas atmosphere or in a pure oxygen atmosphere in order to remove the moisture and hydroxyl groups introduced during production and remaining on the particle surfaces and in the particles. Of course, the hydroxyl groups can be removed by utilizing an atmosphere containing chlorine and fluorine. To perform uniform partial sintering in the lengthwise direction of the glass body, zone-sintering may be employed to obtain especially favorable results.

STEPS (3) AND (4) METHOD OF IMMERSION AND DEPOSITING DOPANT

The dopant doped in the porous glass body to change the particle index of the glass must meet the following requirements.

(1) The dopant should contain an element capable of greatly increasing the refractive index in relation to the amount doped.

(2) The dopant compound precipitated on the surfaces of the pores of a porous glass body should form an oxide after treatment at high temperatures, e.g., at which pores begin to collapse, and should be sufficiently diffused into the skeleton of the silica to form a glass having a small dopant concentration variation. In other words, the dopant should be composed of an element which has a high diffusion rate. Accordingly, the dopant should be composed of an oxide of an element having a valence of one, or two at the greatest.

(3) The dopant should not adversely result in optical transmission loss.

Because of these requirements, the dopant preferably is Tl$_2$O, Cs$_2$O, or Rb$_2$O, or a mixture thereof with a monovalent or divalent oxide. Suitable monovalent oxides which can be used in addition to Rb$_2$O, Cs$_2$O and Tl$_2$O include Li$_2$O, Na$_2$O and K$_2$O, and suitable divalent oxides which can be used include BeO, MgO, CaO, SrO and BaO.

Tl$_2$O, however, is quite toxic, whereas Cs$_2$O and Rb$_2$O are easy to handle. The invention, therefore, primarily employs Cs$_2$O and Rb$_2$O. Other oxides such as B$_2$O$_3$, Al$_2$O$_3$, Ga$_2$O$_3$, In$_2$O$_3$, Sc$_2$O$_3$, Y$_2$O$_3$, La$_2$O$_3$, TiO$_2$, ZrO$_2$, HfO$_2$, GeO$_2$, SnO$_2$, PbO$_2$, P$_2$O$_5$, As$_2$O$_5$, Sb$_2$O$_5$, Bi$_2$O$_5$, etc., may, of course, be employed provided that they do not cause a variation in concentration which adversely results in the transmission loss of the resultant fibers.

Three approaches for depositing a dopant in the pores of the porous glass body in a predetermined concentration distribution in the radial direction of the glass body can be used in this invention.

Figure 1:
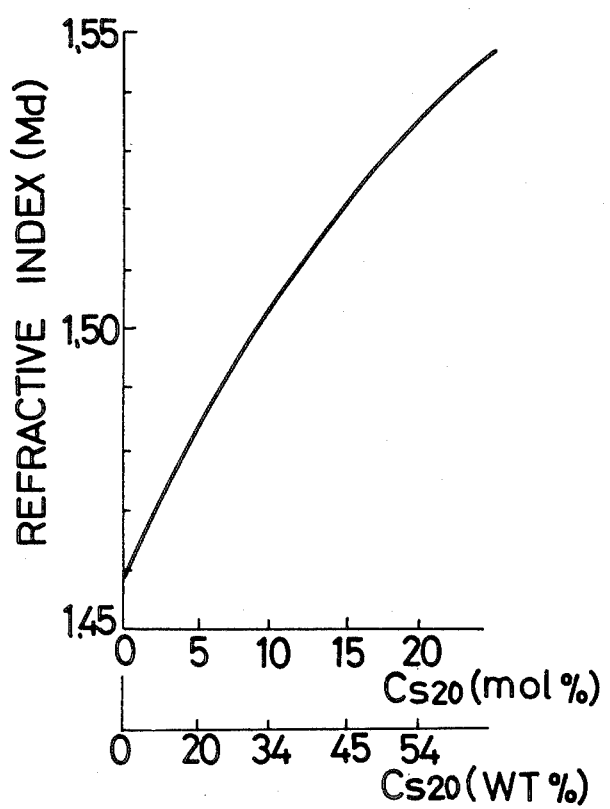
FIG. 1 is a diagram showing the refractive index of a $Cs_2O$—$SiO_2$ glass.

The dopant concentration in a glass and the refractive index of the glass are generally linearly related or are approximately linearly related. FIG. 1, for example, shows the relationship between the concentration of Cs$_2$O as a dopant in a Cs$_2$O—SiO$_2$ type glass and the refractive index of the Cs$_2$O—SiO$_2$ type glass.

Considering this linear or approximately linear relationship, in order to produce a glass body having a greater refractive index toward the center of the glass body as is required in an optical transmission glass, a dopant which increases the refractive index of the glass should be present in large amounts in the central portion of the glass body or a dopant which decreases the refractive index should be present in small amounts in the central portion of the glass body.

The three approaches described below are based on the utilization of the above relationship.

(A) An agglomerate of a fine glass powder is partially sintered as described above to prepare a porous glass body having relatively uniform pores and doped with a dopant which varies the refractive index due to a specific concentration distribution of the dopant (this can be performed, for example, by stuffing an aqueous solution of a dopant compound or by unstuffing precipitation of the dopant compound), followed by the steps (5) and (6) described below.

(B) A partially sintered product having a controlled pore size in the radial direction is prepared by appropriately selecting the composition of the fine glass powder or the partial sintering conditions, whereby the dopant is doped in a predetermined concentration distribution without the step of unstuffing. The product is then subjected to steps (5) and (6) described below.

(C) The porous glass body is subjected to the steps of stuffing of an oxide or compound which is to be doped as an oxide in the future in a vacuum, evaporation of the solvent, precipitation of an oxide or compound followed by steps (5) and (6) below. In this process, the solute is driven into the interior of the glass body as the solvent is evaporated from the exterior of the glass body.

More specifically, the dopant can be precipitated on the surfaces of the pores in a predetermined concentration distribution in the radial direction of the glass body using the three approaches (A), (B) and (C) described above.

A typical method comprises forming an aqueous solution of a salt of a metal element of the dopant, and depositing the salt by utilizing the fact that the solubility of the dopant compound differs depending upon the composition of the solution and the temperature of the solution. This is disclosed in Japanese Pat. No. 145483 which corresponds to U.S. Pat. Nos. 2,315,328 and 2,303,756.

Method (A) which can be used in the invention is carried out by using an aqueous solution of $CsNO_3$, $Cs_2CO_3$, $RbNO_3$ or $Rb_2CO_3$ as a salt whose solubilities vary widely (to increase the effect of precipitation) depending upon the temperature and the solvent. The solubility curves of $CsNO_3$ and $RbNO_3$ in water are shown in FIG. 6. The solubilities of $CsNO_3$ and $RbNO_3$ in methanol or ethanol are not more than 1% by weight at 0° C.

It is, of course, possible to arbitrarily change the solubility within the solubility range described above using water plus methanol, water plus ethanol, water plus propanol or water plus butanol.

A method of depositing $CsNO_3$ onto the pores of the porous glass body in a predetermined concentration distribution is described below.

Deposition of $CsNO_3$ onto Porous Glass Body:

(a) In the case of porous glass bodies obtained using the processes of FIGS. 2 and 3.

A porous glass body is immersed in an aqueous solution having a sufficiently high concentration of $CsNO_3$, for example, in a solution which at a temperature of 80° C. contains $CsNO_3$ in a concentration greater than the saturation concentration of $CsNO_3$, which aqueous solution is prepared at a temperature higher than 80° C. The solution is stuffed into the pores. The concentration of the solution is, of course, determined considering the ultimate design of the preform in regard to the degree of refractive index difference which is to be provided in the preform. Therefore, a solution concentration lower than the saturation concentration at a temperature of 80° C. can be employed depending upon the design of the preform.

The porous glass body is then immersed in water maintained at 0° to 4° C., whereby $CsNO_3$ in an amount corresponding to the difference between the concentration of a high temperature immersion liquid and the solubility at 0° to 4° C. (i.e., 9 g $CsNO_3$/100 g solution) is deposited on the surfaces of the pores. When the glass body is allowed to stand for a while, the $CsNO_3$ deposited in the porous glass body begins to dissolve at the exterior portion of the glass body due to diffusion, since the concentration of $CsNO_3$ in the water outside the porous glass body is near zero. After a while, the $CsNO_3$ concentration in the pores at the exterior portion of the porous glass body reaches 9 g $CsNO_3$/100 g solution, and this exterior layer broadens with the passage of time. When after an appropriate period of time, the porous glass body is immersed in a lower alcohol such as ethanol, methanol, propanol or butanol, almost all of the $CsNO_3$ is precipitated since the solubility of $CsNO_3$ in these alcohols is near zero. In this way, it is possible to prepare a porous glass body in which $CsNO_3$ is precipitated in large amounts toward the center of the glass body and in reduced amounts toward the exterior portion of the glass body.

The amount of $CsNO_3$ precipitated on the exterior portion of the porous glass body can be further reduced by decreasing the solubility of $CsNO_3$ in the immersion liquid using water plus a lower alcohol as described above in place of water.

The preparation of a preform which can ultimately be used to produce a glass body having a stepwise refractive index distribution is described above.

When it is desired to progressively reduce the amount of $CsNO_3$ from the center toward the exterior portion, the solubility of $CsNO_3$ in the immersion liquid outside the porous glass body should be gradually reduced. In order to reduce the solubility of $CsNO_3$ in the immersion liquid gradually, a lower alcohol, e.g., as described above, should be gradually added to the immersion liquid, or the immersion liquid temperature should be gradually decreased.

The two methods described above may be employed simultaneously.

It is, of course, possible to utilize the diffusion of $CsNO_3$ based on a concentration differential by reducing the concentration of $CsNO_3$ in the solution in which the porous glass body is immersed.

(b) Another method of precipitating $CsNO_3$ on the porous glass bodies obtained by the processes of FIG. 2 and FIG. 3 comprises first immersing the porous glass body in an aqueous solution containing $CsNO_3$ maintained at 80° C. or more, so that the liquid is stuffed into the pores of the porous glass body.

The porous glass body is then immersed in a lower alcohol to precipitate the $CsNO_3$ in the pores on the surfaces of the pores. Thereafter, the porous glass body is immersed in water, or in water containing a lower alcohol, e.g., as described above, maintained at a suitable temperature, so that $CsNO_3$ precipitated on the surfaces of the pores on the exterior portion of the porous glass body is dissolved. The porous glass body thus-obtained is immersed again in a lower alcohol, e.g., as described above, which is then replaced by water to cause migration of $CsNO_3$ to cease and to deposit the $CsNO_3$ on the surfaces of the pores in a predetermined concentration.

(c) For porous glass bodies obtained by the processes of FIG. 4 and FIG. 5.

(i) A glass rod is inserted in a hole formed by removing the target material at the center of the porous glass body thereby to reduce the clearance. Methods (a) and (b) described above can then be employed.

(ii) After the porous glass body has been immersed in water at a high temperature or placed in a vacuum, an aqueous solution having a high $CsNO_3$ concentration is introduced into a cavity at the central portion of the porous glass body and allowed to stand in the cavity for some time with $CsNO_3$ diffusing into the pores. Thereafter, the temperature is reduced for the glass body is immersed in a lower alcohol, e.g., as described above, to precipitate $CsNO_3$ in a predetermined concentration on the surfaces of the pores. The two procedures can be employed simultaneously, if desired.

STEPS (5) AND (6) DRYING IN VACUUM AND COLLAPSING THE PORES OF THE POROUS GLASS BODY

The porous glass body with $CsNO_3$ precipitated in a predetermined concentration of the surfaces of the pores is placed in a vacuum, and dried by gradually increasing the temperature from 0° to 4° C. to room temperature (e.g., about 20°–25° C.) and from room temperature to about 100° C.

The porous glass body is then placed in a vacuum, and gradually heated to remove the lower alcohol and water, and thereafter, the CsNO$_3$ is melted and decomposed into Cs$_2$O and N$_2$O$_5$.

The glass body is then heated for a while, e.g., about 30 minutes to about 3 hours, at a temperature lower than the temperature at which the porous glass body is softened and collapsed (e.g., at 600° to 800° C.), in an oxygen gas stream free from moisture and at a pressure of, e.g., 1 atmosphere. The temperature at which the glass body collapses decreases depending on the amount of Cs$_2$O doped. For example, when the amount of Cs$_2$O doped is that which increases the refractive index by 1% over that of quartz, this temperature is around 1,000° C.

Then, the temperature of the glass body is increased in an oxygen gas stream at a pressure of 0.1 to 0.9 atmosphere to collapse the pores and, to obtain a transparent glass body. When the pressure is smaller than 0.1 atm., the pores are collapsed too fast, and under a pressure greater than 0.9 atm., pores remain and are not destroyed. The pores are, therefore, collapsed under a pressure ranging from 0.1 to 0.9 atmosphere. Preferably, the pressure should range from about ⅓ to 1/5 atmosphere.

Figure 8:
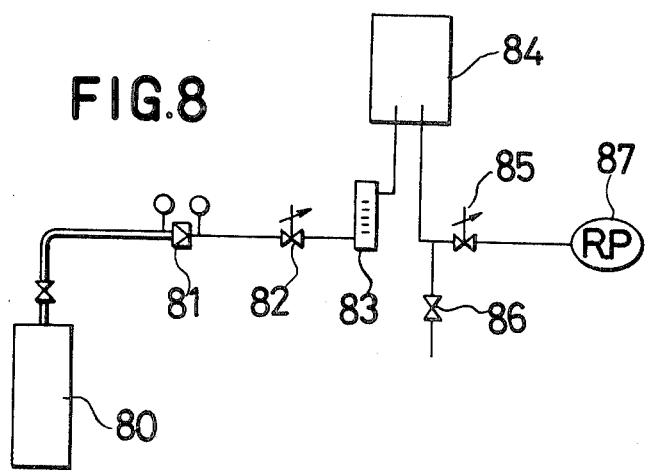
FIG. 8 is a view showing an apparatus for controlling the pressure of oxygen gas between 0 and 1 atmosphere.

An apparatus which can be used for adjusting the oxygen gas pressure is shown in FIG. 8, in which reference numeral 84 denotes a chamber in an electric furnace in which the porous glass body held in a vessel (tube) made of silica is placed. The flow rate and the pressure are adjusted using needle valves 82 and 85 with reference to a flow meter 83. Reference numeral 80 represents an oxygen gas container, 81 a pressure-reducing valve, 86 a by-pass valve, and 87 a rotary pump.

Particularly preferred results are obtained if the porous glass body is collapsed in an atmosphere of an inert gas, such as helium, because pores do not remain. Here, heating can be performed using zone-sintering by which the glass body is sintered in an axial direction starting at one end, or by a sintering method by which the glass body is heated from the central axis thereof.

The preform glass member can thus be prepared. In this case, by adjusting the doping amount of Cs$_2$O with reference to FIG. 1, it is possible to obtain a preform having the desired refractive index distribution. For example, a preform of the clad-type shown in FIG. 9 can be prepared by adjusting the relationship between the doping amount of Cs$_2$O on the core portion and the refractive index as shown in FIG. 1.

A specific example falling within the scope of method (A) which can be used in the present invention is illustrated below.

A glass powder agglomerate of a size of about 20 mm in diameter and 100 ml in volume was prepared using the process shown in FIG. 2.

The density $\rho_0$ was 0.2 g/cm$^3$. When heated at 1,200° C. for 24 hours, the porous glass body exhibited a density $\rho_0$ of 1.0 g/cm$^3$ and a porosity X of about 50%. The porous glass body was then immersed in a CsNO$_3$ aqueous solution of 100 g of CsNO$_3$ and 100 g of H$_2$O at 95° C. for 6 hours, and thereafter, immersed in water maintained at 0° to 4° C. for about 3 hours. During this step, the CsNO$_3$ started at once to precipitate, causing the porous glass body to become white. The CsNO$_3$ on the exterior started to dissolve in water, and a clear region started to form at the exterior portion of the porous glass body.

When immersed in methanol maintained at 0° to 4° C., the entire surface of the porous glass body became white, indicating that precipitation of CsNO$_3$ was taking place. After standing for 24 hours, the porous glass body was removed from the solution, placed under a vacuum, e.g., less than about 10 μm Hg, and heated to a temperature of 700° C. at a rate of 15° C. per hour.

The temperature of the porous glass body was further increased at a rate of 15° C. per hour, and when a temperature of 800° C. was reached, oxygen gas was passed around the glass body. The porous glass body was allowed to stand under this condition for 48 hours. Thereafter, the pressure of the oxygen gas was adjusted to ¼ atomsphere, the porous glass body was further heated to a temperature of 1,050° C. at a rate of 50° C. per hour while passing oxygen gas at a rate of 500 cc per minute around the glass body, and the glass preform was then allowed to cool naturally for 1 hour.

Figure 9:
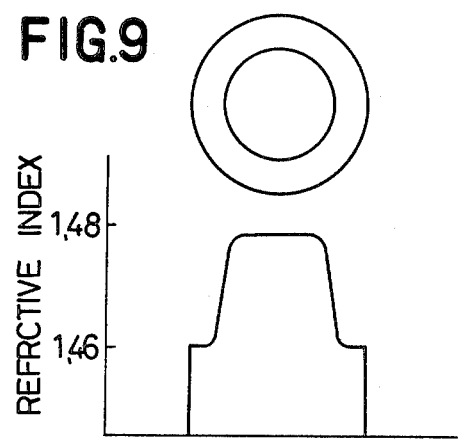
FIG. 9 is a diagram showing the refractive index distribution across a cross section of a preform.
Figure 10:
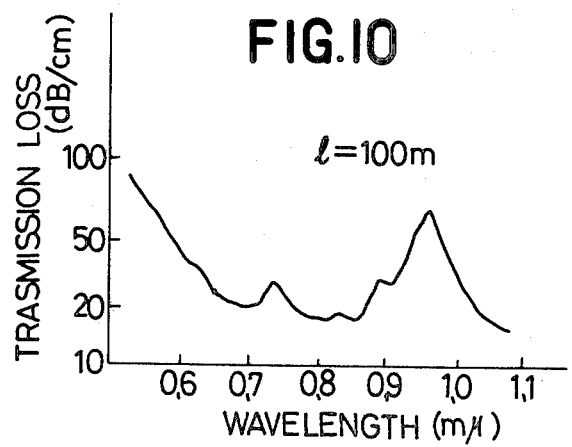
FIG. 10 is a diagram showing the optical transmission loss characteristics of fibers prepared by the process of the invention.

The preform thus obtained had a diameter of 8 mm and exhibited the refractive index distribution as shown in FIG. 9. The preform was then melt-spun to obtain fibers which exhibited the transmission losses shown in FIG. 10.

Method (B) is illustrated below.

A porous glass body was immersed in a solution of an oxide that serves as a dopant or of a compound which, upon decomposition or reaction, becomes an oxide. The solution is thus stuffed into the fine pores. The solvent of the solution is then removed, and the oxide or the compound that serves as a dopant precipitates on the surface of the pores. The pores are then collapsed at a high temperature, and the concentration of the oxide dopant formed in the glass after collapsing has a value which corresponds to the concentration of the oxide or the compound in the solution present in the pores.

For example, if a partially sintered product of a fine glass powder agglomerate is immersed in an aqueous solution of CsNO$_3$, maintained at a suitable temperature, e.g., at 100° C., and a concentration, e.g., 67% by weight, and if the solvent is then removed by drying, and CsNO$_3$ precipitates on the surfaces of the pores. The Cs$_2$O is formed as a result of drying and heating at high temperatures as represented by the reaction $$2CsNO_3 \rightarrow Cs_2O + N_2O_5$$

and is precipitated on the surfaces of the pores. After collapsing the pores, a glass preform doped with Cs$_2$O is obtained. In this case, the relationship among these parameters is given below. In the collapsed glass:

$$\text{wt \% Cs}_2\text{O} = \frac{K^{Cs_2O}_{CsNO_3} \times C_{CsNO_3} \times \rho_{CsNO_3} \times \alpha dv}{K^{Cs_2O}_{CsNO_3} \times C_{CsNO_3} \times \rho_{CsNO_3} \times \alpha dv + \rho_{skeleton} \times (1-\alpha)dv} \times 100$$

$$= \frac{C_{CsNO_3} \times \rho_{CsNO_3}}{C_{CsNO_3} \times \rho_{CsNO_3} + 1.446 \times (\frac{1}{\alpha} - 1)\rho_{skeleton}} \times 100$$

wherein $$K^{Cs_2O}_{CsNO_3} = \frac{\text{Molecular Weight of Cs}_2\text{O}}{2 \times (\text{Molecular Weight of CsNO}_3)} = \frac{281.82}{2 \times 194.92} = \frac{1}{1,446}$$

Figure 11:
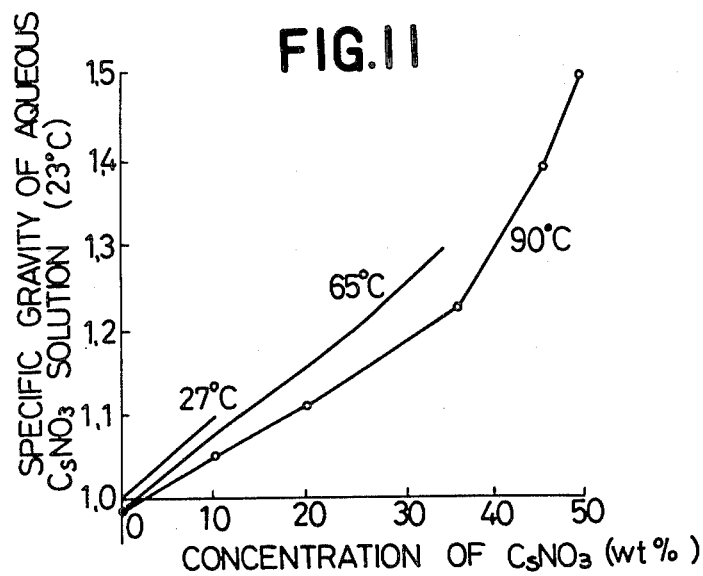
FIG. 11 is a diagram showing the specific gravity of an aqueous $CsNO_3$ solution.
Figure 12:
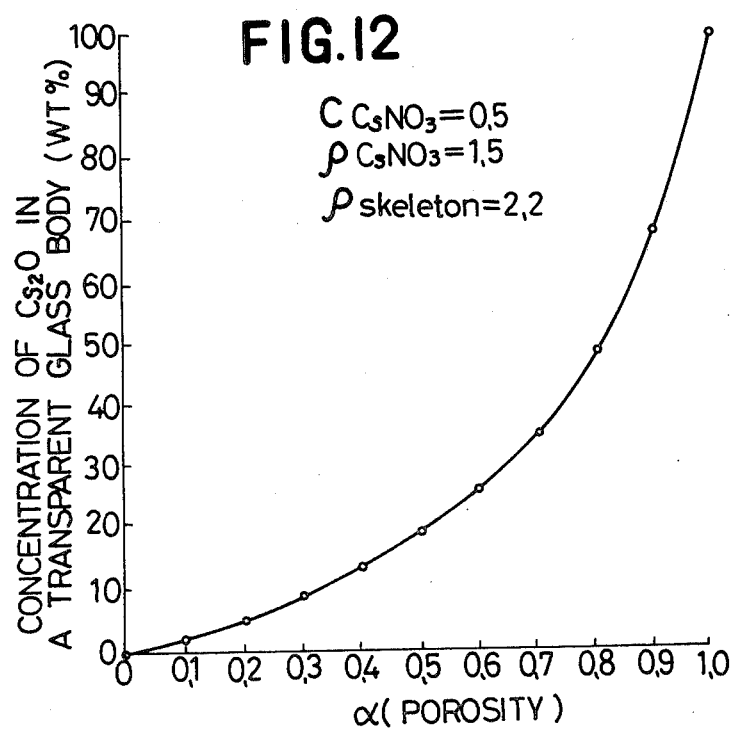
FIG. 12 is a diagram showing the $Cs_2O$ concentration versus the porosity of a glass member after collapsing.

$C_{CsNO_3}$: Weight ratio of CsNO₃ in the stuffing solution
$\rho_{CsNO_3}$: Specific gravity of the stuffing solution
α: Porosity
1/α: Degree of shrinking
ρskeleton: Specific gravity of the partially sintered glass
dv: Small volume FIG. 11 shows the porosity and Cs₂O concentration when a porous glass body of SiO₂ glass is immersed in an aqueous solution containing 50% by weight of CsNO₃ maintained at a temperature of 90° C., dried to remove water that serves as a solvent, and collapsed at a high temperature to dope Cs₂O, utilizing the specific gravity data for an aqueous solution of CsNO₃ shown in FIG. 11.

It can be understood from the above that it is possible to obtain a glass body having a dopant concentration which changes in the radial direction by changing the size of the fine pores, i.e., by changing the porosity in the radial direction of the porous glass body, even when the glass body is immersed in a solvent having a constant CsNO₃ concentration.

An example of the preparation of a porous glass body having a varying porosity is illustrated below.

The following relationship exists between the porosity α and the viscosity η (determined depending upon the temperature of sintering and the composition) of the fine glass powder agglomerate when the fine glass powder agglomerate is partially sintered at a temperature and for a period of time which cause the glass powder agglomerate to be sintered and converted into a transparent glass.

$$\alpha = 1 - \left(\frac{L_\infty}{L_0}\right)^3 \frac{1}{\left(1 - \frac{3\gamma}{4a\eta} \cdot t\right)^3}$$

wherein
$L_0$ is the initial length of the glass powder agglomerate,
$L_\infty$ is the length of the glass after sintering,
a is the radius of the glass particles,
γ is the surface tension, and
t is the partial sintering time That is, if the viscosity η is increased, the porosity α becomes large. In other words, if the viscosity η is decreased, the porosity α becomes small.

(1) First, a method in which the glass composition is changed to vary the viscosity and thereby change the porosity is described below.

An SiO₂ glass doped with an oxide which affects the refractive index only slightly and which reduces the viscosity, i.e., the viscosity of an SiO₂ glass doped with Al₂O₃, B₂O₃ or P₂O₅, changes depending upon the amount doped. Therefore, a glass composition of this sort is most suitable for the present invention.

A specific example of the above is described in detail below with reference to FIG. 13. A fine glass powder 133 is prepared and deposited using flame hydrolysis or oxidation of starting material gases using a plasma flame of a plasma torch 132 which is reciprocally moved in the axial direction on the outside of a rotary mandrel 131. To prepare a fine glass powder agglomerate 134, a core of SiO₂ powder 134Co is first prepared from a silicon compound such as SiCl₄ as a starting material gas, and then a cladding layer of B₂O₃—SiO powder 134Cl is prepared from a silicon compound such as SiCl₄ and a boron compound such as BBr₃ as starting materials. Alternatively, powder 134 can be a P₂O₅—SiO₂ or Al₂O₃—SiO₂ powder. The powder agglomerates are then partially sintered to adjust the size of the pores. Here, the viscosity of the B₂O₃—SiO₂ glass is smaller than the viscosity of the SiO₂ and, therefore, has an increased density. Therefore, the resultant porous glass body has a low porosity (e.g., about 30%) at the center portion which is composed of SiO₂ and a high porosity (e.g., about 70%) on the exterior portion composed of B₂O₃—SiO₂.

The porous glass body is then immersed in a CsNO₃ aqueous solution heated at a high temperature, e.g., at 95° C., and dried to remove the water by evaporation. The glass body is then heated in a vacuum while introducing oxygen, chlorine or fluorine to remove the hydroxyl groups sufficiently. The glass body is then heated in an inert gas atmosphere, in a vacuum, e.g., at less than 10 μm Hg, or in an atmosphere of oxygen at a reduced pressure, e.g., 1/10 to 9/10 atm., to collapse the fine pores of the glass body thereby to obtain a transparent glass member.

Here, the heating can be performed using zone-sintering by which the glass body is sintered starting at one end in the axial direction or by sintering where the glass body is heated from the central axis thereof.

The surfaces of the tube so prepared of the transparent glass are then washed with hydrogen fluoride and, as required, machined using a glass lathe with the application of heat from an oxygen-hydrogen flame 135 to prepare a rod 136 while collapsing the fine pores.

The tube or rod thus-prepared is melt-spun to obtain fibers for optical transmission.

It should be noted here that the doping amount of B₂O₃ for adjusting the porosity is restricted by the coefficient of expansion of the collapsed transparent glass.

If the glass has a low viscosity η, the porosity of the glass body after partial sintering becomes great. When the porosity is high, however, the Cs₂O is precipitated in large amounts, whereby the viscosity is decreased at the time of collapsing, making it possible to obtain a transparent glass having a completely balanced porosity.

This holds true for the balance of the coefficient of expansion, and produces desirable effects for the process of the present invention. According to the present invention, the B₂O₃ can be doped not only stepwise in the radial direction as shown in FIG. 13, but also the amount of the B₂O₃ doping can be gradually increased. In this case, the refractive index distribution will be of a continuously parabolically changing nature.

It is also possible to increase the doping amount of B₂O₃ in the radial direction by employing the method described above but without using a rotary mandrel as a target material onto which the glass powder is deposited, thereby providing at least two sources for producing the fine glass powder to grow the fine glass powder agglomerate in the axial direction. In this case, the step of removing the rotary mandrel target material can be omitted.

(2) A method in which the temperature at the time of partial sintering is changed to vary the viscosity, and thereby to adjust the porosity is described below.

If a fine glass powder agglomerate is partially sintered after a predetermined time interval with a temperature gradient in the radial direction of the glass powder agglomerate, it is possible to prepare a porous glass body with different porosities in the radial direction.

This procedure can be accomplished by a method in which the sintering temperature is so distributed that it is lower at the center of the glass body and is higher toward the exterior thereof, so that the degree of sintering is higher toward the exterior to keep the porosity small, and by a method in which the sintering temperature is so distributed that the sintering temperature is higher at the center of the glass body and is lower toward the exterior thereof, so that the degree of sintering is smaller toward the exterior to keep the porosity larger.

An example of the above method of preparation is shown in FIG. 14-a.

A fine powder of $SiO_2$ glass 141 is accumulated on the outside of a rotary mandrel that works as a deposition target as shown in FIG. 14-a, utilizing flame hydrolysis or oxidation by a plasma flame while reciprocally moving the mandrel in the axial direction. The interior of the cylindrical porous glass powder agglomerate formed by removing the target material is so cooled that the combustion temperature $T_1°$ C. is lower, and the exterior of the cylinder is so heated that the combustion temperature $T_2°$ C. is higher. In this case, the porous glass body will have large pores in the interior thereof and small pores on the exterior thereof, such pores being formed continuously as diagrammed in FIG. 14-b.

The glass body is then immersed in a dopant compound which increases the refractive index of the glass, for example, in a $CsNO_3$ aqueous solution maintained at a high temperature, and dried to remove water by evaporation. The glass body is further heated in a vacuum, e.g., less than about 10 μm Hg, followed by introduction of oxygen, chlorine or fluorine to sufficiently remove the hydroxyl groups. The glass body is then heated in a vacuum or in an atmosphere of oxygen at a reduced pressure, e.g., 1/10 to 9/10 atm., to collapse the pores, thereby to obtain a transparent glass body.

The foregoing description relates to the introduction of a dopant, which increases the refractive index, into the porous glass body having a high porosity toward the interior portion thereof and a low porosity toward the exterior portion. It is also possible to prepare a glass body for optical transmission by doping a dopant compound which decreases the refractive index, such as $B_2O_3$, fluorine or a fluorine compound such as $CCl_2F_2$, $CF_4$, $SiF_4$, $POF_3$, etc., into the porous glass body having a low porosity toward the interior thereof and a high porosity toward the exterior thereof. The porous glass body above should be prepared under conditions which are reverse to the conditions described above.

Another specific example of method (B) which can be used in the present invention is given below.

With reference to the method shown in FIG. 13, the $SiO_2$ powder was accumulated to a thickness of 10 mm on the carbon rod and the 7% $B_2O_3$—$SiO_2$ was accumulated thereon to a thickness of 10 mm. After being heated at 1,050° C. for 24 hours, the layers contracted to thicknesses of 7 mm and 3 mm, respectively. The carbon rod was then removed. The resulting porous glass body was immersed in an aqueous solution containing 50% by weight of $CsNO_3$ maintained at 95° C. for 10 hours, removed from the solution, dried in a vacuum, and then heated in a vacuum to 700° C. at a rate of 15° C. per hour. The porous glass body was then maintained in an oxygen stream for 48 hours, heated at a rate of 15° C. per hour in an atmosphere of oxygen at a pressure of 1/10 atmosphere and a helium pressure of 1/5 atmosphere, maintained at a temperature of 1,100° C. for 30 minutes, and was further heated. The inner and outer surfaces of the resultant glass tube were washed with hydrofluoric acid. The glass tube was then treated using a glass lathe to collapse the pores. As a result, a round rod of a diameter of about 12 mm of a core and a clad was obtained. After the surfaces were optically polished, the rod was washed with hydrogen fluoride to obtain a rod of a diameter of 11.5 mm. The rod was melt-spun to make fibers. Light was sufficiently trapped in the core, and optical loss was small, i.e., 17 dB/km at $\lambda=0.83$ μm.

According to the process of the present invention, advantageous effects can be obtained. Some are described below.

(1) The porous glass body produced from the fine glass powder prepared by the CVD method contains very small amounts of impurities such as transition metals. Further, since the partial sintering and collapsing are performed in a vacuum or in an anhydrous oxygen atmosphere and/or in an atmosphere of an inert gas such as helium, the amount of hydroxyl groups present is very small, thus drastically reducing optical transmission losses.

(2) The porous glass body can be prepared at low cost using inexpensive compounds such as $SiCl_4$, $AlCl_3$ or $POCl_3$ as starting materials. Furthermore, the porosity of the glass body can be easily controlled, enabling a good quality porous glass body to be obtained at low cost.

(3) If the partially sintered porous glass body is not formed in a cylindrical shape or a circular cylindrical shape, the outside of the glass body may be ground to attain the desired shape easily, and the axial symmetry can be improved.

(4) It is possible to obtain a glass member having low transmission losses due to the use of a compound such as $SiCl_4$, $AlCl_3$, $POCl_3$, $BBr_3$, etc., as a starting material, and the use of a compound which can be easily produced with high purity, as an oxide dopant or a dopant compound which turns into an oxide upon decomposition or reaction.

(5) By employing method (A) in the present invention, a dopant compound which turns into an oxide dopant, for example, $CsNO_3$, which precipitates in the porous glass body can be easily precipitated in a predetermined concentration distribution in the radial direction by changing the composition of the surrounding solution and the temperature with the passage of time. It is possible, therefore, to prepare a preform having a predetermined dopant concentration distribution after the collapsing has been completed.

In the preform and the resulting fibers, the cesium concentration distribution is very smooth, without developing a refractive index distribution of the shape of growth rings that often occur in the case of modified chemical vapor deposition (M-CVD) methods. It is, therefore, possible to make fibers having a very small signal distortion.

(6) Moreover, by using method (B), the pore distribution can be adjusted in the radial direction, whereby the dopant for increasing or decreasing the refractive index can be diffused in the desired concentration distribution. It is possible, therefore, to prepare a glass member having a desired refractive index distribution in the radial direction.

(7) Using an alkali metal oxide having a high diffusion rate as a dopant, the dopant distribution becomes continuous in the radial direction. Hence, fibers having small signal distortion can be obtained.

(8) Since an oxide or a compound which upon decomposition or reaction turns into the oxide can be doped into the porous glass body in very good yields, a glass member can be obtained at low cost.

Moreover, the present invention provides an improved heat-treating method that can be employed for the step of collapsing (6) described above.

In collapsing, the heating temperature or the heating time for collapsing the fine pores is not often sufficient for the dopant such as an alkali metal oxide such as $Cs_2O$, $Rb_2O$, $Tl_2O$, etc., or the like precipitated in the fine pores in the matrix of the porous glass body to completely diffuse. In such a case, a difference in composition between the initial matrix layer and the dopant layer develops. The variation in composition gives rise to the development of optical transmission losses when light is to be transmitted based on Rayleigh scattering or Mie scattering.

The present invention provides a process which removes such deficiencies. In order for the dopant to be sufficiently mixed into the glass matrix, the temperature and time must be sufficient for the dopant to diffuse. The temperature and time must be found experimentally for each glass composition. An example of such is described below.

If the glass body is allowed to stand in an ordinary electric furnace heated at a high temperature, for example, about 1,100° C., the glass rod or tube deforms due to its own weight. To prevent this from happening, the glass rod or tube is rotated to remove the deformation effect due to weight. This, however, is not enough. For the rod or tube to have a thermal history of a uniform temperature and time in the lengthwise direction thereof, a furnace having a long and uniform temperature distribution must be used or the rod or tube must be moved relative to the source of heating. In this case, the heating can be performed in two ways; i.e., the rod or tube can be heated locally and slowly, or all of the surfaces of the rod or tube can be uniformly heated.

By virtue of this improvement, the present invention makes it possible to provide a good preform having small optical transmission losses.

The heat-treating methods of the present invention are specifically described below.

One method comprises heating the glass body externally using a glass lathe, as shown in FIG. 15.

A glass rod 153 is gripped by rotary chucks 152A, 152B of a glass lathe 151, and both ends are rotated synchronously. Then flame 155 is produced by burner 154 which burns, for example, a city gas-oxygen mixture, and the glass rod is heated and so moved that the temperature is uniform in the lengthwise direction.

When the glass rod or tube is soft, however, the gaseous pressure created by the flame results in adverse effects. In such a case, the glass rod or tube should be heated using an electric furnace, an infrared lamp or a $CO_2$ laser, to avoid these adverse effects. However, since heating using a $CO_2$ laser requires a large apparatus, the glass rod or tube is preferably heated moving the glass rod or tube. In using an electric furnace, the glass sample does not have to be necessarily moved if the sample is placed in such a location which receives a uniform temperature distribution.

Another method comprises rotating a glass rod using a glass lathe, and increasing the temperature using an electric furnace, infrared heating or a flame, followed by high frequency electromagnetic induction heating or dielectric heating. In this case, also, either one of the induction coil or the cavity and the rod is moved such that they are moved relative to each other.

A further method suitable for a glass rod or tube which has a low softening point and in which considerable deformation occurs at a temperature sufficient for fusing the dopant into the glass matrix is described below. A specific example of this method is shown in FIG. 16, in which rods or tubes 162, 163 made of a material such as platinum, silica glass or carbon, inert to reaction at high temperatures, are turned at an equal peripheral speed in contact with the glass rod or tube that is to be heat-treated, whereby the axes of the rods or tubes 162, 163 are arrayed in parallel and the glass rod or tube 161 to be heat-treated is placed upon them and rotated. The rod or tube 161 to be heat-treated is heat treated at a desired temperature and for a desired period of time using the external heating and internal heating described above without deformation occurring.

A still further method is shown in FIG. 17, in which a tube 172 made of a material such as platinum, silica glass or carbon, inert to reaction at high temperatures, is rotated at a constant speed. Then, a glass rod or tube 171 to be heat-treated is introduced in the hole of tube 172 and rotated. The glass rod or tube 171 to be heat-treated is externally heated and internally heated at the desired temperature and for the desired period of time without deformation developing.

Particularly, when supporting rods 162, 163, and tube 172 of FIGS. 16 and 17 are made of platinum or carbon, these rods and tube can be heated by induction heating, making it possible to easily control the temperature of the glass rods and tubes.

The methods described in FIGS. 16 and 17 also make it possible to obtain the effects described below in addition to the effects described above for the present invention.

(1) Deformation of the glass rod or tube developed at the time of collapsing the fine pores can be minimized.

(2) If the rods 162, 163 and tube 172 are formed in a tapered shape, or if the two rods 162 and 163 are arrayed out of parallel, it is possible to obtain tapered glass rods and tubes.

The thus-obtained preform contains the dopant in a predetermined concentration distribution such that a predetermined refractive index is exhibited in the radial direction.

The distance between the layer formed by the precipitation of the dopant and the glass matrix is very small as compared to the radius, whereby the layer of the precipitate of the dopant and the glass matrix are mixed well by the heat-treatment under ordinary conditions. However, the concentration distribution of the dopant scarcely changes in the radial direction.

If a glass body having a dopant in a predetermined concentration distribution in the radial direction is cooled quickly, the residual stress becomes so great that breakage results. In such a case, the heating temperature should be reduced gradually over extended periods of time and, further, as required, the distortion should be removed over a given temperature range, to eliminate the defects described above.

In this heat treatment, if the heating time is prolonged, the dopant concentration distribution is destroyed in the radial direction. Utilizing this phenomenon, however, it is also possible to obtain a glass body having a parabolic concentration distribution as designated at 184 in FIG. 18 based on the diffusion of the dopant, i.e., a stepped concentration distribution 183 is imparted to core 181 and clad 182, and the core and the clad are heated at a very high temperature for an extended period of time, for example, at about 1,200° C. for about 50 hours.

To utilize this phenomenon positively, high temperature conditions should be employed. An embodiment of this is illustrated below.

$SiO_2$ powder containing 4% of $B_2O_3$ was produced using flame hydrolysis, and accumulated on a rotated plate to prepare a glass powder agglomerate. The agglomerate was then partially sintered to prepare a porous glass body having a porosity of 50%. The porous glass body was then immersed in an aqueous solution containing 60% by weight of $CsNO_3$ maintained at a high temperature (90° C.), immersed in a methanol aqueous solution maintained at 0° to 4° C. to precipitate the $CsNO_3$ utilizing the difference in solubility. The $CsNO_3$ precipitated in the fine pores on the exterior of the porous glass body was then removed utilizing the difference in concentration between the interior and exterior of the porous glass body. The resulting porous glass body was dried in a vacuum, e.g., at less than about 10 μm Hg, heated at a high temperature, e.g., about 625° C., so that the $CsNO_3$ was converted to $Cs_2O$, and thereafter, oxygen gas was admitted to collapse the porous glass body at 850° C. in an oxygen atmosphere of a pressure less than 1 atmosphere, thereby to obtain a stepped preform having a clad diameter of 10 mm and a core diameter of 5 mm. The preform was then divided into two. One of the pieces was not treated additionally. The other piece was treated using the apparatus of FIG. 17 of the present invention, i.e., introduced into the center of a carbon tube of an inner diameter of 20 mm and an outer diameter of 30 mm, whereby the preform was rotated and heated at 1,000° C. for 74 hours using high frequency induction heating while reciprocally moving the carbon tube at a rate of 10 mm per second. The preform was then cooled from 1,000° C. to 400° C. over a period of 12 hours.

The above two preforms were spun into fibers of a diameter of 150 μm and a length of 100 meters to measure the optical losses. The optical loss of the fiber made of the preform which was not treated additionally was 100 dB/km at $\lambda = 0.83$ μm and that of the fiber of the preform treated additionally was 1.5 dB/km. Furthermore, the wavelength/loss characteristics revealed that the former fiber exhibited a great scattering loss. It was also found that the latter fiber exhibited a refractive index distribution which was slightly smoothened.

The heat treatment which can be used in the present invention described above provides the following effects:

(1) By effecting the heat treatment so that the precipitated dopant is uniformly mixed into the glass matrix, a preform having small scattering losses and small optical transmission losses can be obtained.

(2) The heat treatment from the outside or inside of a glass rod or tube while rotating the rod or tube results in a thermal history which is uniform in the circumferential direction.

(3) The relative movement of the glass rod or tube and the source of heating, or the placement of the glass rod or tube in a furnace having a uniform temperature distribution provides the glass rod or tube with a thermal history which is uniform in the lengthwise direction.

(4) By heating the glass rod or tube by placing the rod or tube on rotating support rods or inserting the rod or tube into the rotating tube, the glass rod or tube can be heat-treated without deformation tending to occur. Further, the deformation of the glass rod or tube which is a starting material can be corrected, if some deformation occurs.

(5) Either a change or a lack of change in the dopant concentration distribution in the radial direction can be obtained. In the latter case, the preform having a stepped dopant concentration distribution is heated at high temperatures to facilitate the diffusion of dopant.

(6) To cool the glass body after heat-treatment, the power of the heating source should be gradually reduced with the passage of time to attain the desired cooling rate. It is, therefore, possible to prevent the cracking which can occur due to residual stress.

The heat-treatment method described above can also be employed with porous glass bodies prepared from a phase-separable glass.

In some cases, however, it is often undesirable for the dopant to be present in fine pores near the surface of a porous glass body containing dopant obtained in a method described above. Such cases are encountered when the dopant is an alkali metal oxide, e.g., as described above, or an alkali metal salt, e.g., as described above, which, upon decomposition or reaction at high temperatures, becomes an alkali metal oxide. In such a case, if the porous glass body is melt-spun to prepare fibers, the alkali metal oxide often deteriorates the strength of the fibers depending upon the spinning conditions and further degrades the wear characteristics of the fibers under high humidity conditions.

In order to remove the defects described above, the present invention provides a process for removing the dopant from at least the outer side of the preform.

This process comprises converting the dopant present in the fine pores of the porous glass body into a chelate compound using an extracting agent, and extracting the chelate compound with a solvent. This extraction treatment can be performed before or after the porous glass body impregnated with the dopant is dried in a vacuum.

This process is illustrated below with reference to the use of $CsNO_3$. It should, however, be noted that this process is applicable not only to the use of $CsNO_3$ but also to the use of other cesium dopant compounds such as $Cs_2CO_3$, $Cs_2SO_4$, CsCl and the like, as well as such other alkali metal salts as $RbNO_3$, $Rb_2CO_3$, etc., and other metal salts such as $TlNO_3$, $Tl_2CO_3$, and the like.

Examples of suitable chelating agents which can be used for cesium compounds are thenoyltrifluoroacetone (hereinafter abbreviated as TTA), 4-butyl-2-α-methylbenzyl phenol (hereinafter abbreviated as BAMBP), dipicrylamine and the like. Other known chelating agents may, of course, be employed. When the chelating agents described above are used, an organic solvent such as benzene, toluene, xylene, nitrobenzene, cyclohexane, chloroform, carbon tetrachloride, dichloroethane, alcohols, acetone, ketone, ether, petroleum ether, tributyl phosphate, ethyl acetate, and methyl isobutyl ketone (MIBK), can be used.

An example of the use of TTA as a chelating agent is given below.

A porous glass body, immediately after a layer of a small $CsNO_3$ concentration has been formed or after drying has been finished, is immersed in an acidic aqueous solution or a benzene solution of TTA for a required period of time, for example, about 10 minutes, to extract cesium precipitated in the pores at the exterior as a chelate compound of the formula

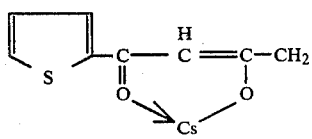

with a benzene solvent.

An example of the use of BAMBP as a chelating agent is given below.

A porous glass body, immediately after a layer of a low $CsNO_3$ concentration has been formed or after drying is finished, is first immersed in a dilute aqueous solution of $NH_4OH$ for a required period of time, such that the solution in the pores at the exterior becomes alkaline (pH 11 to 13). An aqueous solution of $Cs_2CO_3$ can also be used instead of the $NH_4OH$ solution. The porous glass body is then immersed in a mixed solvent of 100 ml of cyclohexane containing 1 mol of BAMBP and 25 g of phenol, so that cesium is extracted into the solvent. The porous glass body is further washed with phenol plus cyclohexane or with cyclohexane. The reaction at this time can be represented by the following

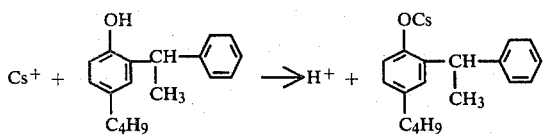

For a porous glass body where $Cs_2CO_3$ is precipitated instead of $CsNO_3$, the glass body can be immediately immersed in a solvent of the composition described above for a required period of time, and then immersed in a mixed solvent of phenol plus cyclohexane or in cyclohexane to achieve the extraction.

When dipicrylamine is used as a chelating agent, a porous glass body, immediately after a layer of a small $CsNO_3$ concentration has been formed or drying has been finished, is immersed in an aqueous solution of an ammonium salt of dipicrylamine, so that the cesium precipitated in the pores on the exterior is extracted in the form of a dipicrylamine salt. The porous glass body is then immersed in nitrobenzene to extract cesium further. The subsequent steps can be carried out in a customary manner. However, in order to completely remove the organic solvent, the drying must be sufficiently effected within a temperature range that does not cause decomposition.

If the organic solvent still cannot be completely removed, oxygen may be supplied as required, to remove the solvent in the form of gases such as $CO_2$, $H_2O$ and the like.

An example of extraction processing is described below.

Glass rods (6 mm in diameter) composed of $Na_2O$—$K_2O$—$B_2O_3$—$SiO_2$ were melted and pulled up, subjected to a phase-separation heat treatment, followed by leaching (e.g., with 3 N HCl at 95° C.) to prepare porous glass rods having a porosity of about 50%. After sufficient washing with ultrapure water (e.g., $\delta = 18$ M$\omega$·cm), the porous glass rod was immersed in a $CsNO_3$ aqueous solution of a composition of 100 g $CsNO_3$/100 g $H_2O$ maintained at 95° C., and thereafter immersed in water maintained at 0° to 4° C. for 3 hours. The glass rods were gradually heated from this temperature to room temperature in a vacuum.

Thereafter, one of these rods was immersed in an aqueous solution of $NH_4OH$ for about 1.5 seconds using the method as described above, and then immediately immersed in 100 ml of cyclohexane containing 1 mol of BAMBP and 25 g of phenol to effect the extraction. Extraction and washing were further conducted using cyclohexane. The glass rod was then dried at room temperature in a vacuum, e.g., about 1 μm Hg, for 100 hours, and then gradually heated to 650° C. in a vacuum, e.g., about 1 μm Hg, together with a glass rod which had not been subjected to the above treatment. The rods were then maintained at a temperature of 650° C. for 24 hours in an atmosphere of oxygen at a pressure of 1 atm., and were then finally heated at 850° C. in an atmosphere of oxygen at a pressure of ⅓ atm., thereby to obtain a transparent glass body. The resulting preform (of a diameter of about 5 mm) subjected to the treatment of the present invention contained $Cs_2O$ in an amount smaller than 0.03% by weight (with respect to the weight of the preform) on the surfaces thereof, whereas the preform which was not subjected to the treatment of the present invention contained $Cs_2O$ in an amount of about 0.8% by weight on the surfaces thereof.

The strength and wet twist acceleration of fibers obtained by melt-spinning these preforms were tested. As a result, the fibers of the present invention exhibited the results which were superior by more than two-fold the results obtained with fibers which had not been subjected to the treatment of the present invention.

By reducing the amounts of the alkali metal oxides in the outermost layers, the following advantages can be obtained:

(i) The strength of the fibers, depending on the spinning conditions, is not lost.

(ii) The coefficient of expansion becomes low at the outermost layers, whereby compression stress is developed at the surface, making it possible to obtain fibers having increased strength.

(iii) The absence of an alkali metal on the surface serves to improve resistance against corrosion and wear.

The process described above for removing the dopant can be employed not only for removal of dopant present in a preform prepared by partial sintering of fine silica powder, but also for removal of dopant present in other preforms such as preforms obtained from a phase-separable glass.

While the invention has been described in detail and with reference to specific embodiments thereof, it will be apparent to one skilled in the art that various changes and modifications can be made therein without departing from the spirit and scope thereof.

What is claimed is:

1. A process for producing a glass member which comprises
    (1) subjecting a silicon, boron, phosphorus or aluminum compound or both a silicon, boron, phosphorus or aluminum compound and a dopant compound to vapor phase reaction to form a fine powder of fused silica, borate, phosphate or alumina or doped fused silica, borate, phosphate or alumina;

(2) partially sintering the powder in an inert gas, an anhydrous oxygen gas, chlorine gas, fluorine gas or in a vacuum to form a porous glass body;

(3) immersing the porous glass body in a solution containing a dopant compound;

(4) depositing the dopant command on the surfaces of the pores in the porous glass body;

(5) drying the porous glass body in a vacuum, and then (6) collapsing the pores of the porous glass body in a vacuum, or in an oxygen or inert gas atmosphere free of moisture to produce the glass member.

2. The process of claim 1, wherein the depositing step includes depositing the dopant compound on the surfaces of the pores of the porous glass body in a predetermined concentration distribution as a function of distance from the center of the porous glass body.

3. The process of claim 1 or 2, wherein the powder of fused silica, borate, phosphate or alumina or doped fused silica, borate, phosphate or alumina is produced by using an oxygen flame, a natural gas-oxygen flame, a propane oxygen flame, or a plasma flame, and is accumulated on a rotary plate prior to the partial sintering step.

4. The process of claim 1 or 2, wherein the process includes, prior to the partial sintering step, accumulating the powder of fused silica, borate, phosphate, or alumina or doped fused silica, borate, phosphate, or alumina on a refractory material which is rotated and reciprocally moved in the direction of the axis of rotation.

5. The process of claim 1 or 2, wherein the porous glass body has a porosity of from about 10 to about 90% by volume, and contains interconnected pores.

6. The process of claim 1 or 2, wherein the partial sintering step includes partially sintering the fused silica, borate, phosphate, or alumina or doped fused silica, borate phosphate or alumina powder for extended periods of time at a temperature lower than the sintering temperature required for converting the porous glass body to a transparent glass to adjust the porosity of the porous glass body.

7. The process of claim 1 or 2, wherein the partial sintering step includes partially sintering the fused silica, phosphate, borate or alumina or doped fused silica, borate, phosphate or alumina powder by maintaining the powder for a short period of time at a temperature higher than the temperature for adjusting the porosity of the porous glass body, and thereafter maintaining the powder at a relatively low temperature for an extended period of time to adjust the porosity of the porous glass body.

8. The process of claim 1 or 2, wherein the solution containing a dopant compound is an aqueous solution of the dopant compound, and the depositing step includes depositing the dopant compound on the surfaces of the pores by either using a difference in solubility depending on ions copresent or a difference in solubility due to a difference in the solvent.

9. The process of claim 8, wherein the dopant compound is a cesium compound, a rubidium compound or a thallium compound.

10. The process of claim 1 or 2, wherein the solution containing the dopant compound is an aqueous solution of $RbNO_3$ or $CsNO_3$.

11. The process of claim 1 or 2, wherein the immersing step comprises immersing the porous glass body in an aqueous solution of $RbNO_3$ or $CsNO_3$ maintained at 80° C. or higher to fill the pores of the porous glass body with the aqueous solution of $RbNO_3$ or $CsNO_3$, then adding a lower alcohol selected from the group consisting of methanol, ethanol, propanol and butanol to the aqueous solution or reducing the temperature of the aqueous solution of $RbNO_3$ or $CsNO_3$ thereby to decrease the solubility of $RbNO_3$ or $CsNO_3$ in the aqueous solution of $RbNO_3$ or $CsNO_3$ around the porous glass body and to reduce the concentration of $RbNO_3$ in the aqueous solution of $RbNO_3$ or $CsNO_3$ present in the pores at the exterior portion of the porous glass body, and then immersing the porous glass body in a lower alcohol selected from the group consisting of methanol, ethanol, propanol and butanol to replace the water present in the pores and deposit $RbNO_3$ or $CsNO_3$ on the surfaces of the pores in a predetermined $RbNO_3$ or $CsNO_3$ concentration distribution.

12. The process of claim 1 or 2, wherein the immersing step comprises immersing the porous glass body in an aqueous solution of $RbNO_3$ or $CsNO_3$ maintained at 80° C. or higher to fill the pores of the porous glass body with the aqueous solution of $RbNO_3$ or $CsNO_3$ and reducing the temperature of the aqueous solution of $RbNO_3$ or $CsNO_3$ thereby to decrease the solubility of $RbNO_3$ or $CsNO_3$ in the aqueous solution of $RbNO_3$ or $CsNO_3$ around the porous glass body and to reduce the concentration of $RbNO_3$ or $CsNO_3$ in the aqueous solution of $RbNO_3$ or $CsNO_3$ present in the pores at the exterior portion of the porous glass body, and then immersing the porous glass body in a lower alcohol selected from the group consisting of methanol, ethanol, propanol and butanol to replace the water present in the pores and deposit $RbNO_3$ or $CsNO_3$ on the surfaces of the pores in a predetermined $RbNO_3$ or $CsNO_3$ concentration distribution.

13. The process of claim 1 or 2, wherein the immersing step comprises immersing the porous glass body in an aqueous solution of $RbNO_3$ or $CsNO_3$ at 80° C. or higher to fill the pores of the glass body with the aqueous solution of $RbNO_3$ or $CsNO_3$, immersing the porous glass body in water to cause the $RbNO_3$ or $CsNO_3$ in the aqueous solution present in the pores at the exterior of the porous glass body to move to the surroundings of the porous glass body and to reduce the concentration of $RbNO_3$ or $CsNO_3$ in the aqueous solution present in the pores at the exterior of the porous glass body, and immersing the porous glass body in a lower alcohol selected from the group consisting of ethanol, methanol, propanol and butanol to replace water present in the pores and to deposit $RbNO_3$ or $CsNO_3$ on the surfaces of the pores in a predetermined $RbNO_3$ or $CsNO_3$ concentration distribution.

14. The process of claim 1 or 2, wherein the immersing step includes immersing the porous glass body in an aqueous solution of $RbNO_3$ or $CsNO_3$ at 80° C. or higher to fill the pores of the porous glass body with the aqueous solution of $RbNO_3$ or $CsNO_3$, immersing the porous glass body in hot water or water containing a lower alcohol selected from the group consisting of methanol, ethanol, propanol and butanol at a temperature sufficient to dissolve $RbNO_3$ or $CsNO_3$ deposited on the surfaces of the pores at the exterior portion of the porous glass body, and thereafter immersing the porous glass body in said lower alcohol to replace the water present in the pores and to stop diffusion of $RbNO_3$ or $CsNO_3$ thereby to deposit $RbNO_3$ or $CsNO_3$ on the surface of the pores in a predetermined concentration distribution.

15. The process of claim 1 or 2, wherein the porous glass body is a cylindrical porous glass body and the immersing step includes filling a cavity in the central portion of the cylindrical porous glass body with an aqueous solution of $RbNO_3$ or $CsNO_3$ at a temperature of 80° C. or higher, and after allowing such to stand for a predetermined period of time, immersing the porous glass body in a lower alcohol selected from the group consisting of methanol, ethanol, propanol and butanol to deposit $RbNO_3$ or $CsNO_3$ on the surfaces of the pores so that $RbNO_3$ or $CsNO_3$ is diffused and distributed in a predetermined concentration.

16. The process of claim 1 or 2, wherein said dopant compound is $RbNO_3$ or $CsNO_3$ and the drying step includes after depositing the $RbNO_3$ or $CsNO_3$ in the pores, gradually heating the porous glass body in a vacuum to remove any solvent or water, and decomposing the $RbNO_3$ or $CsNO_3$ to $Rb_2O$ or $Cs_2O$, and removing the $N_2O_5$ generated by the decomposition.

17. The process of claim 1 or 2, wherein the immersing step comprises immersing the porous glass body in an aqueous solution of $Rb_2CO_3$ or $Cs_2CO_3$ at 80° C. or higher to fill the pores of the glass body with the aqueous solution of $Rb_2CO_3$ or $Cs_2CO_3$, immersing the porous glass body in water to cause the $Rb_2CO_3$ or $Cs_2CO_3$ in the aqueous solution present in the pores at the exterior of the porous glass body to move to the surroundings of the porous glass body and to reduce the concentration of $Rb_2CO_3$ or $Cs_2CO_3$ in the aqueous solution present in the pores at the exterior of the porous glass body, and immersing the porous glass body in a lower alcohol selected from the group consisting of methanol, ethanol, propanol and butanol to replace water present in the pores and to deposit $Rb_2CO_3$ or $Cs_2CO_3$ on the surfaces of the pores in a predetermined $Rb_2CO_3$ or $Cs_2CO_3$ concentration distribution.

18. The process of claim 2, wherein the depositing step includes depositing the dopant compound on the surfaces of the pores of the porous glass body in a predetermined concentration distribution in the radial direction by adjusting the size of the pores in the radial direction during the partial sintering.

19. The process of claim 18, wherein the temperature during the partial sintering step is so distributed in the porous glass body that the temperature is lower at the central portion and higher at the exterior portion of the porous glass body thereby to increase the degree of sintering progressively toward the exterior of the porous glass body and to reduce the size of the pores, and wherein the dopant compound is a dopant which increases the refractive index or is a compound capable of being converted to the dopant upon decomposition or reaction at high temperature.

20. The process of claim 18, wherein the temperature during the partial sintering step is so distributed in the porous glass body that the temperature is higher at the central portion and lower at the exterior of the porous glass body thereby to decrease the degree of sintering progressively toward the exterior and to increase the size of the pores, and wherein the dopant compound is a dopant which decreases the refractive index or is a compound capable of being converted to the dopant upon decomposition or reaction at high temperature.

21. The process of claim 18, wherein the porous glass body is a partially sintered cylindrical body composed of a fine powder of fused silica, phosphate, borate or alumina and containing a dopant having a small effect on changing the refractive index in a concentration progressively increasing toward the exterior of the cylindrical body thereby increasing the degree of sintering progressively toward the exterior and decreasing the size of the pores, and wherein said dopant compound is a dopant which increases the refractive index or is a compound capable of being converted to the dopant upon decomposition or reaction.

22. The process of claim 21, wherein the dopant is $B_2O_3$, $Al_2O_3$ or $P_2O_5$.

23. A process for heat-treating a glass body, which comprises rotating the glass member obtained in claim 1, and heating the glass member using infrared light, a laser, a flame a plasma flame, an electric furnace, high frequency induction heating, or induction heating as a heating means, whereby the dopant is sufficiently diffused into the matrix of the porous glass body to render the glass entirely homogeneous.

24. The process of claim 23, wherein the heating means is moved relative to and parallel to the axis of the glass member to be heat-treated, so that the glass member contains a dopant uniformly in the circumferential direction thereof.

25. The process of claim 23, wherein the entire glass body is positioned such that the temperature is uniformly distributed relative thereto.

26. The process of claim 23, 24 or 25, wherein the process includes gradually reducing the heating temperature to reduce the residual stress and to prevent cracking.

27. A process for producing a glass member free of dopant in the surface layer thereof, which comprises chelating the dopant compound in the pores near the surface of the glass member obtained by the process of claim 1 using an extracting agent, and extracting the chelate compound with a solvent to remove the dopant compound from the surface layer of the glass member.

28. The process of claim 27, wherein the dopant compound is an alkali metal salt selected from the group consisting of $TlNO_3$, $CsNO_3$, $RbNO_3$, $Tl_2CO_3$, $Cs_2CO_3$ and $Rb_2CO_3$.

29. The process of claim 27, wherein when the dopant compound is selected from the group consisting of $CsNO_3$, $Cs_2CO_3$, $CS_2SO_4$ or $CsCl$, the extracting agent is selected from the group consisting of thenoyltrifluoroacetone, dipicrylamine or 4-butyl-2-methylbenzylphenol, and the solvent is an organic solvent selected from the group consisting of benzene, toluene, xylene, nitrobenzene, cyclohexane, chloroform, carbon tetrachloride, dichloroethane, an alcohol, a ketone, an ether, petroleum ether, tributyl phosphate, and ethyl acetate.

30. The process of claim 29, wherein the solvent is an organic solvent selected from the group consisting of acetone and methyl isobutyl ketone.

* * * * *